L. L. KNOX.
REGENERATIVE REVERSING FURNACE.
APPLICATION FILED MAY 12, 1910.
978,822.
Patented Dec. 13, 1910.
5 SHEETS—SHEET 3.
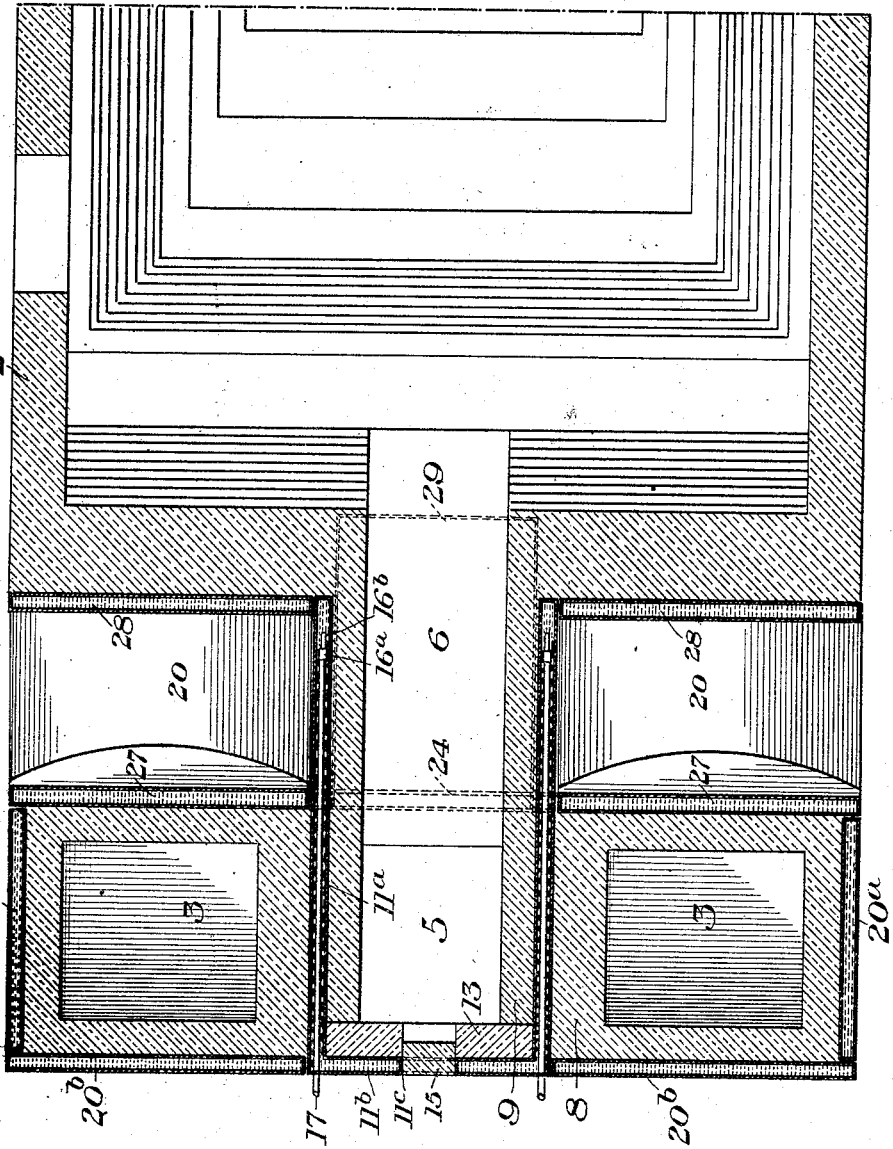

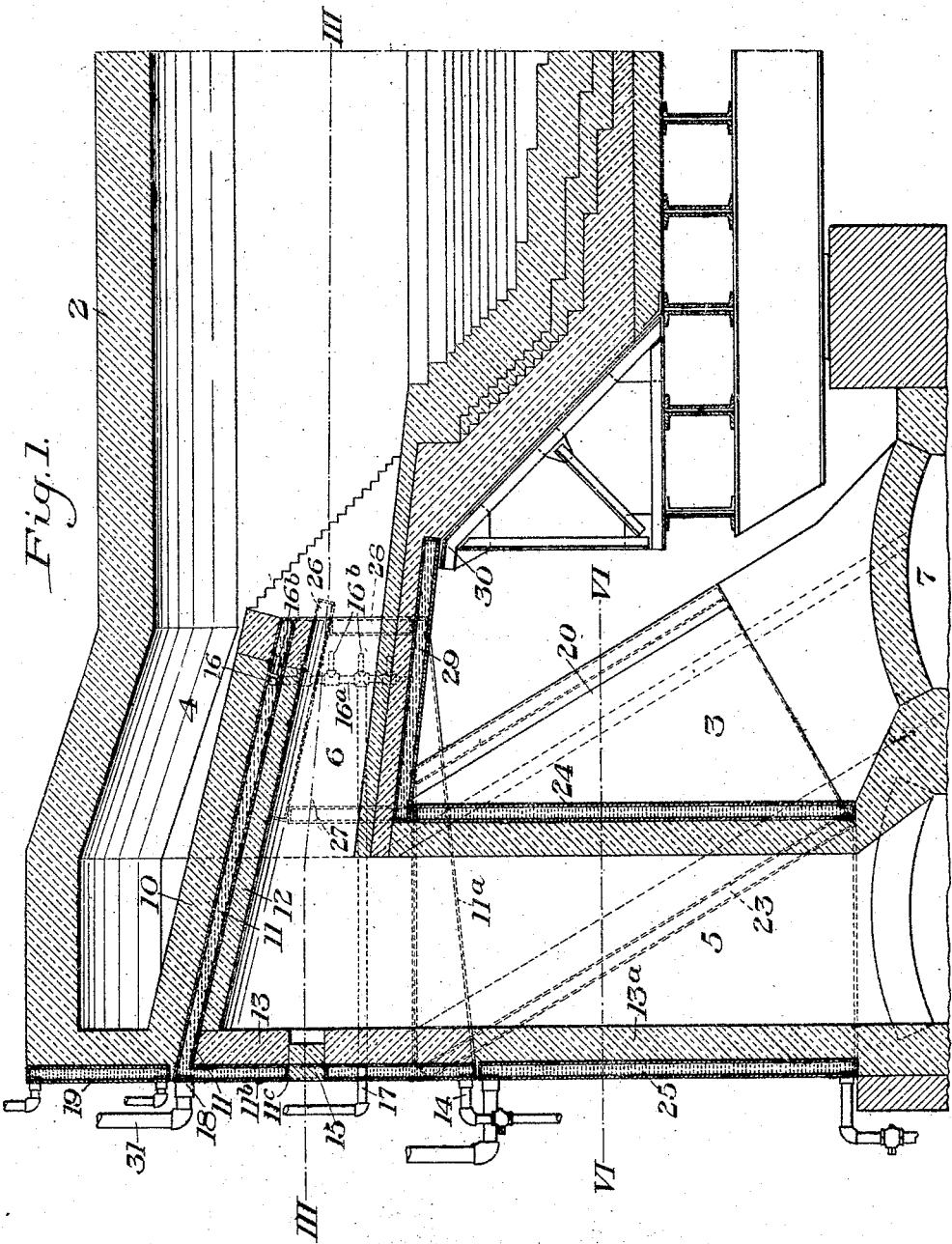

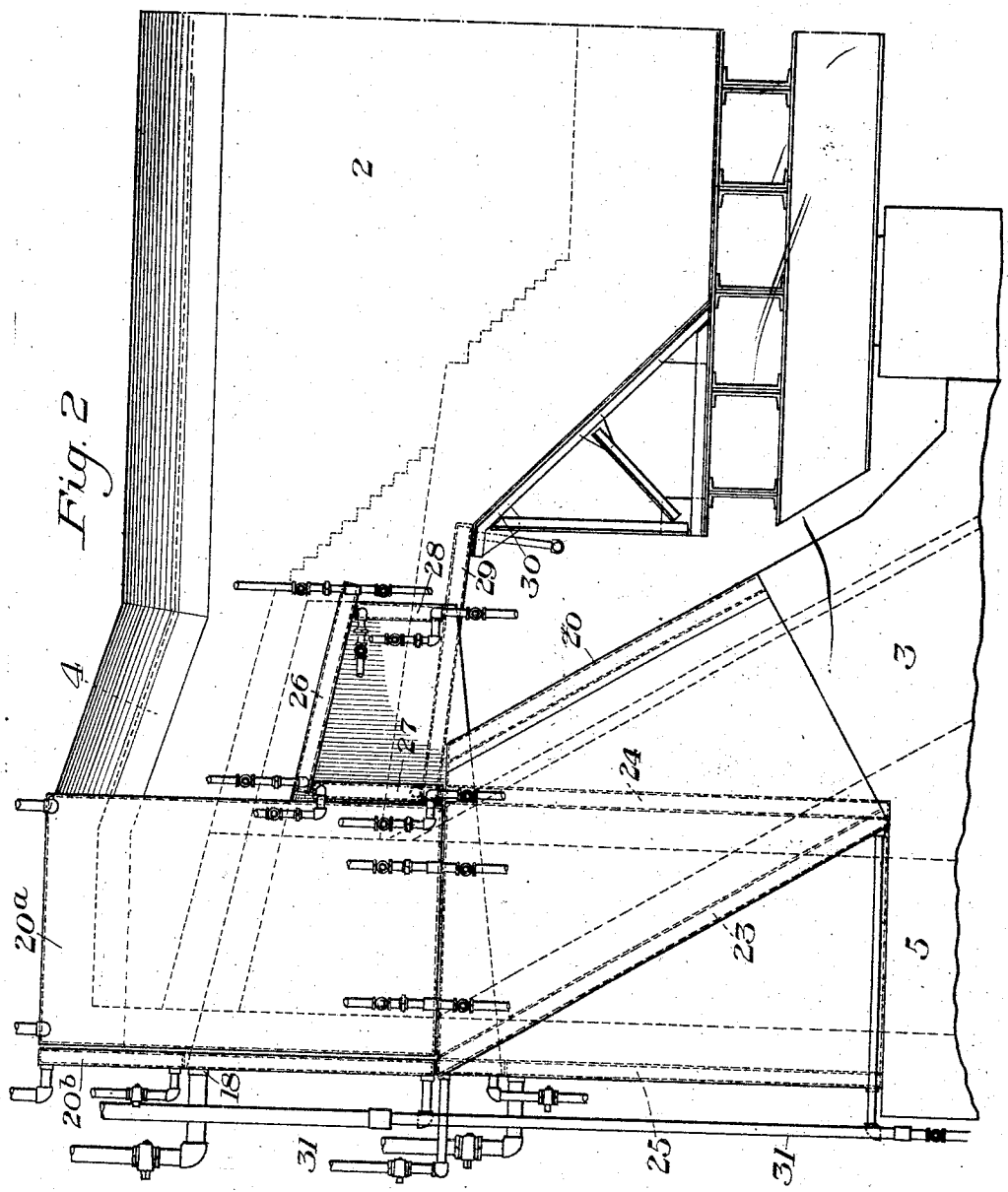

L. L. KNOX.
REGENERATIVE REVERSING FURNACE.
APPLICATION FILED MAY 12, 1910.
978,822.
Patented Dec. 13, 1910.
5 SHEETS—SHEET 4.
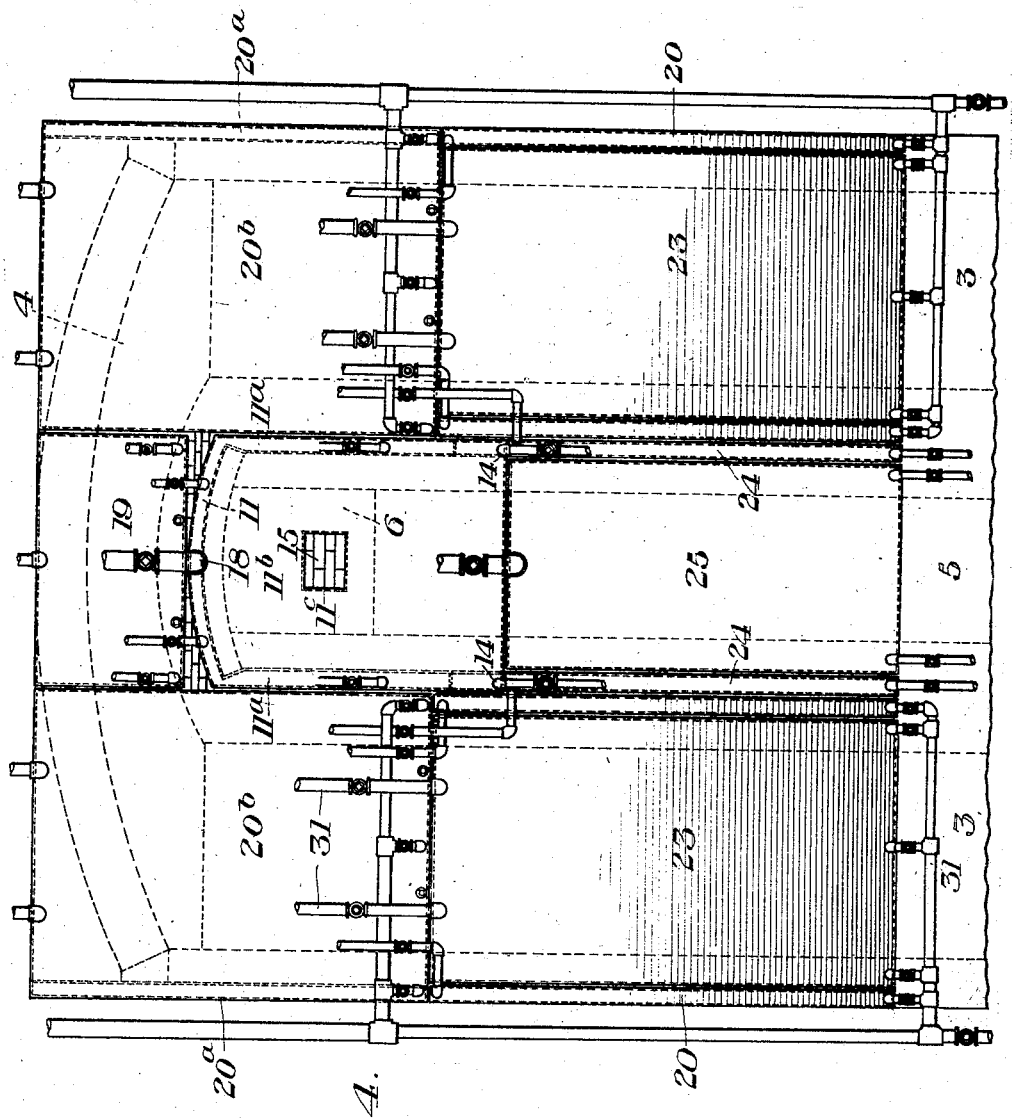
WITNESSES
INVENTOR

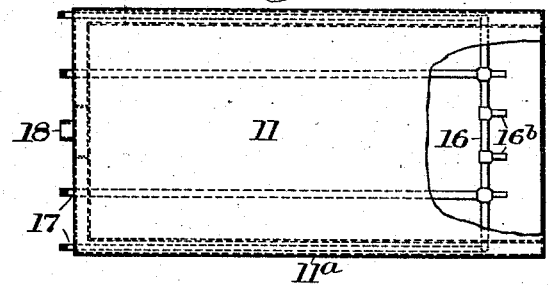
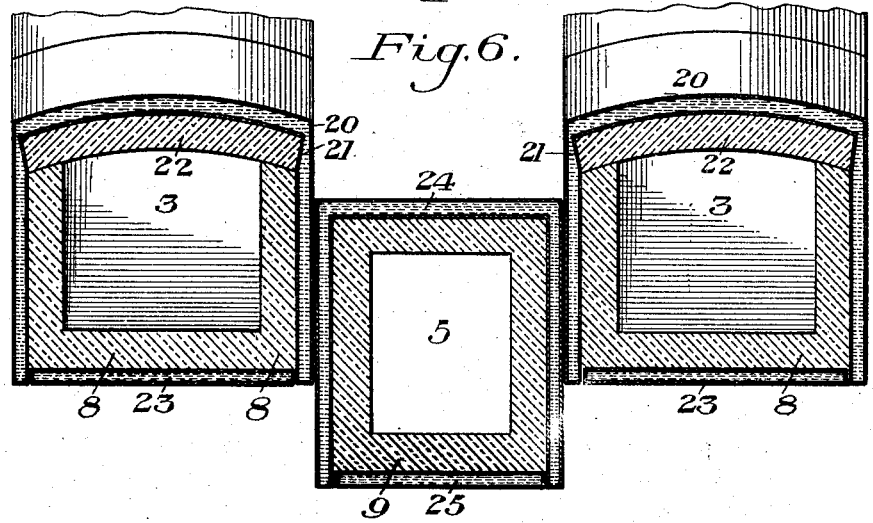
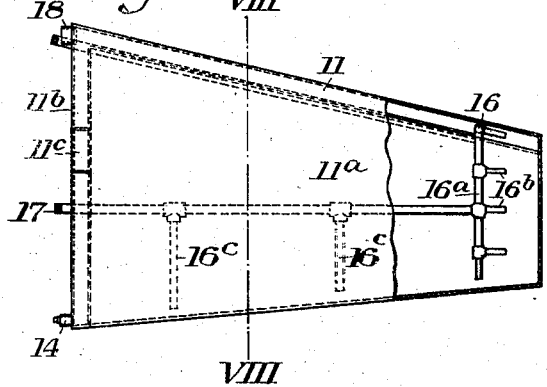

UNITED STATES PATENT OFFICE.

LUTHER L. KNOX, OF AVALON, PENNSYLVANIA, ASSIGNOR TO KEYSTONE FURNACE CONSTRUCTION COMPANY, OF PITTSBURG, PENNSYLVANIA, A CORPORATION OF PENNSYLVANIA.

REGENERATIVE REVERSING-FURNACE.

978,822.      Specification of Letters Patent.     Patented Dec. 13, 1910.

Application filed May 12, 1910. Serial No. 560,854.

*To all whom it may concern:*

Be it known that I, LUTHER L. KNOX, of Avalon, Allegheny county, Pennsylvania, have invented a new and useful Improvement in Regenerative Reversing-Furnaces, of which the following is a full, clear, and exact description, reference being had to the accompanying drawings, forming part of this specification, in which—

Figure 1 is a vertical section of one end portion of an open hearth furnace embodying my invention; Fig. 2 is a side elevation of the same; Fig. 3 is a section on the line III—III of Fig. 1; Fig. 4 is an end elevation; Fig. 5 is a top plan view, partly broken away of the port cooler; Fig. 6 is a section on the line VI—VI of Fig. 1; Fig. 7 is a side view partly broken away of the port cooler; and Fig. 8 is a section on the line VIII—VIII of Fig. 7.

My invention has relation to certain new and useful improvements in furnaces of the regenerative reversing type, and has more particular relation to means for protecting the ports and uptakes of the furnace from the destructive action of the hot air and gases.

To this end the invention consists in novel means for water-cooling certain portions of the furnace, as hereinafter more fully described.

Referring to the accompanying drawings, the numeral 2 designates the body of the furnace, 3 are the two air uptakes, which at their upper ends communicate with a port 4 leading into the furnace chamber, and 5 is the gas uptake which is located centrally between the two air uptakes, and which communicates at its upper end with a port 6 leading to the furnace chamber. The air uptakes 3 are shown as inclined upwardly and rearwardly from the slag pockets 7, their walls 8 being constructed separately from the wall 9 of the gas uptakes 5.

The arch between the air port 4 and the gas port 6 consists of an upper arched wall 10 of masonry, a metallic cooler 11, and a lower refractory wall or lining 12. The cooler 11, which may be constructed either as a casting or of welded sheets or plates of sheet metal, has the main portion designated 11, extending between the arch 10 and the refractory wall 12; it also has the hollow side legs 11ª, which have a refractory lining; and it also has the depending outer end portion 11ᵇ having a refractory lining 13, which forms an upper continuation of the refractory wall 13ª of the gas uptake 5. The cooler is of tapered form, having a much greater vertical depth at its outer end than at its inner end, the taper being at both its upper and lower sides, whereby the lowest point in the cooler is at its lower outer corner where it is provided with a clean-out connection 14. Inasmuch as all dirt and sediment will collect at the lowest point, this construction and arrangement provides means whereby this port cooler may be readily and easily cleaned, and which is a matter of some considerable practical importance. The outer portion 11ᵇ of the port cooler is preferably provided with a poke opening 11ᶜ, which is normally closed by means of a filling 15 of brick or other suitable material.

The main or top portion 11 of the port cooler is provided with the skew-backs 11ᵈ which support the refractory wall 12, which forms the roof of the gas port. Within the inner end portion of the cooler is a spray pipe having a horizontal arm 16 which extends transversely through the portion 11 of the cooler and vertical legs 16ª which extend downwardly within each of the side legs 11ª thereof, each of these legs being provided with a plurality of spray or jet pipes or nozzles 16ᵇ. This spray pipe is supplied with water by means of a plurality of pipes 17 which have a combined capacity at least equal to that of the combined spray or jets 16ᵇ. The pipes 17 may also be provided with the downwardly extending branches 16ᶜ which discharge at points adjacent to the bottom walls of the side legs 11ª. The water discharged by these jets strikes directly against the inner end walls of the cooler which are most directly exposed to the heat of the furnace, and which gives an effective cooling protection. The discharged water as it becomes heated rises to the discharge 18 at the upper central, and highest portion of the cooler. It will be seen that this cooler protects not only the bottom wall of the air port 4, but also the top, side and outer end wall of the gas port 6, which includes the upper portion of the gas uptake 5. Should it become burned out, it together with its refractory lining, may be removed from underneath the arch 10 and may be replaced.

The outer end wall of the gas port 4 is protected by a cooling plate 19. Each of the up-takes 3 and 5 is also preferably protected by inclosing cooling plates, as will be best seen by reference to Fig. 6. In this figure 20 designates hollow cooling plates, which extend around three sides of the lower inclined portion of each of the air uptakes 3, and which are formed with the skew-backs 21, which carry the refractory arches 22 which form one wall of each of these uptakes. The fourth side of the inclined portion of each uptake 3 is protected by a separate cooling plate 23. The upper portion of each uptake 3 is protected at the sides and front by coolers 20ª and 20ᵇ. The gas uptake is protected by a cooling plate 24 extending around three sides thereof and by another plate 25 at the fourth side. It will be seen by reference to this figure that the walls of the air and gas uptakes are separated by a sufficient space to receive these cooling plates, and that there is thus provided a double cooler between the adjacent walls of the air and gas uptakes.

The bottom wall of the arch 10 of the air port 4, at each side of the gas port 6 is protected by a cooling plate 26. These cooling plates lie underneath the arch 10 at each side of the gas port, and are supported by the vertical coolers 27 and 28. The coolers 27 protect the front wall of the air uptakes above the cooler 20, and the coolers 28 protect the rear walls of the furnace 2 at the sides of the gas flue and below the port 4. The bottom wall of the gas port 6, forward of the up-take 5 is protected by a cooler 29, which is supported at one end on the upper end of the cooler 24 and at its opposite end by the frame 30 of the hearth portion of the furnace, as clearly seen in Fig. 1.

31 wherever seen designates circulating connections for the various cooling-plates. These circulating connections may be arranged in various ways, but are preferably so arranged in all cases that the incoming water will enter at the lowest point of the cooling plate, while the outlet connection for the heated water is at the highest point of the plate.

It will be seen that my invention provides means of simple and effective character by means of which the furnace ports and gas and air uptakes of a furnace of the regenerative reversing type may be effectually protected from the cutting action of the hot air and gases.

While I have shown my invention applied to one end only of a furnace, it will be understood that the ports and uptakes at both ends are preferably of similar construction and arrangement.

What I claim is:—

1. In a regenerative reversing furnace, a removable port cooler comprising an upper portion lying within the arch which separates the gas and air ports, side portions which inclose the gas port, and an outer end portion which protects the outer end wall of the gas port and gas uptake, said cooler being tapered and having its lower portion at its outer lower corner, and said outer lower corner being provided with a clean-out connection; substantially as described.

2. In a furnace of the regenerative reversing type, a port cooler comprising an upper member arranged to extend within the arch separating the gas and air ports, said portions inclosing the sides of the gas port and of the upper portion of the gas uptake, and an end portion forming a cooler for the end wall of the upper portion of the uptake, said cooler having skew-backs which support a refractory lining for the upper wall of the gas port, and the cooler being of greater vertical depth at its outer end than at its inner end and having its lowest point at its lower outer corner; substantially as described.

3. In a furnace cooling means, a port cooler having a portion to extend within the arch between the gas and air ports, and also having portions arranged to extend downwardly at the sides of the gas port, a spray pipe located at the inner portion thereof and arranged to discharge against its inner end wall, and a plurality of supply pipes connected to said spray pipe and extending to the outer end of the cooler; substantially as described.

4. In a regenerative reversing furnace, a port cooler having a portion to extend within the arch between the gas and air ports, and side portions which inclose the gas port, of a spray pipe extending within said cooler near its inner end and arranged to discharge against the inner end wall thereof, said spray pipe extending downwardly within the side portions of the cooler, and connections for supplying water to the spray pipe; substantially as described.

5. In a regenerative reversing furnace, gas and air uptakes having separate refractory walls, and hollow cooling plates surrounding each of said uptakes on all sides thereof, the gas uptake extending centrally between the air uptakes, and the refractory walls of the gas and air uptakes being protected by the adjacent cooling plates of both the gas and air uptakes; substantially as described.

6. In a regenerative reversing furnace, an air uptake leading in an inclined direction from the slag pot to the air port of the furnace, and having one of its walls arched, and a cooling plate having skew-backs which support the arched wall; substantially as described.

7. In a regenerative reversing furnace, an air uptake having an arched wall and a cooling plate having skew-backs supporting the arched wall, said cooling member extending around three sides of the uptake; substantially as described.

8. In a regenerative reversing furnace, an air uptake having an arched wall and a cooling plate having skew-backs supporting the arched wall, said cooling member extending around three sides of the uptake, and another cooling plate protecting the fourth side of the uptake; substantially as described.

9. A regenerative reversing furnace having gas and air ports and a wall or arch separating said ports, said wall or arch having a cooling member therein, and other cooling members at the sides of the first-named cooling member and protecting the bottom wall of the air port; substantially as described.

10. In a regenerative reversing furnace having a gas uptake and a port connecting the uptake to the furnace chamber, a cooling jacket for the uptake, and a cooling member extending underneath the gas port and supported by the said jacket; substantially as described.

11. A regenerative reversing furnace, having a gas uptake, and a gas port leading therefrom and provided with a refractory wall, and a cooling plate extending underneath said wall, said plate being supported at one end on the gas uptake, and the furnace having its frame provided with a support for the opposite end of the plate; substantially as described.

12. In a regenerative reversing furnace, air and gas uptakes having their outer walls or bulk head provided with a water jacket fitting against the refractory material thereof, said jacket being formed in separate sections, said sections covering substantially the entire outer surface of the front walls of the gas and air uptakes, and the joints between the sections being so placed that the sections covering any uptake can be separately removed; substantially as described.

13. A regenerative reversing furnace having inclined air uptakes and a central vertical gas uptake, an air port connecting the upper ends of the air uptakes with the furnace chamber, and a gas port connecting the upper end of the gas uptake with the furnace chamber, a refractory wall separating said ports, a cooling element in said wall, cooling elements at the sides of the gas port, a cooling element underneath the bottom of the gas port, and a cooling element underneath the air port at each side of the gas port; substantially as described.

14. In a regenerative reversing furnace, a removable port cooler comprising an upper portion lying within the arch which separates the gas and air ports, side portions which inclose the gas port, and an outer end portion which protects the outer end wall of the gas port and gas uptake; substantially as described.

In testimony whereof, I have hereunto set my hand.

LUTHER L. KNOX.

Witnesses:
H. M. CORWIN,
GEO. H. PARMELEE.